United States Patent [19]

Atalla et al.

[11] Patent Number: 4,965,568

[45] Date of Patent: Oct. 23, 1990

[54] MULTILEVEL SECURITY APPARATUS AND METHOD WITH PERSONAL KEY

[76] Inventors: Martin M. Atalla, 18 Monte Vista Ave., Atherton, Calif. 94025; Webster D. Hopkins, 2425 Rick Dr., Morgan Hill, Calif. 95020

[21] Appl. No.: 317,676

[22] Filed: Mar. 1, 1989

[51] Int. Cl.⁵ .......................... H04Q 5/00; H04L 9/00
[52] U.S. Cl. ............................. 340/825.340; 235/379; 380/21; 380/23; 380/24; 380/29
[58] Field of Search ............... 235/379, 380, 381, 382, 235/382.5; 340/825.34, 825.3, 825.31, 825.32, 825.33; 380/21, 23, 24, 25, 44, 45, 29; 902/2, 4, 5, 8

[56] References Cited

U.S. PATENT DOCUMENTS

| | | | |
|---|---|---|---|
| 3,798,605 | 3/1974 | Feistel | 340/172.5 |
| 3,862,716 | 1/1975 | Black et al. | 235/61.7 B |
| 3,956,615 | 5/1976 | Anderson et al. | 235/61.7 B |
| 4,016,405 | 4/1977 | McCune et al. | 235/61.7 B |
| 4,048,475 | 9/1977 | Yoshida | 235/61.7 B |
| 4,075,460 | 2/1976 | Gorgens | 235/420 |
| 4,123,747 | 10/1978 | Lancto et al. | 340/149 A |
| 4,186,871 | 2/1980 | Anderson et al. | 235/380 |
| 4,193,131 | 3/1980 | Lennon et al. | 375/2 |
| 4,198,619 | 4/1980 | Atalla | 340/149 A |
| 4,200,770 | 4/1980 | Hellman et al. | 380/30 |
| 4,203,166 | 5/1980 | Ehrsam et al. | 375/2 |
| 4,218,738 | 8/1980 | Matyas et al. | 364/200 |
| 4,234,932 | 11/1980 | Gorgens | 364/900 |
| 4,259,720 | 3/1981 | Campbell | 364/200 |
| 4,268,715 | 5/1981 | Atalla | 380/23 |
| 4,283,599 | 8/1981 | Atalla | 380/24 |
| 4,288,659 | 9/1981 | Atalla | 380/23 |
| 4,304,990 | 12/1981 | Atalla | 235/380 |
| 4,315,101 | 2/1982 | Atalla | 380/24 |
| 4,326,098 | 4/1982 | Bouricius et al. | 380/25 |
| 4,357,529 | 11/1982 | Atalla | 235/381 |
| 4,423,287 | 12/1983 | Zeidler | 380/24 |
| 4,536,647 | 8/1985 | Atalla et al. | 235/379 |
| 4,578,530 | 3/1986 | Zeidler | 340/825.34 |
| 4,588,991 | 5/1986 | Atalla | 340/825.31 |
| 4,605,820 | 12/1986 | Campbell, Jr. | 380/24 |
| 4,747,050 | 5/1988 | Brachtl et al. | 340/825.34 |
| 4,870,683 | 9/1989 | Atalla | 380/56 |

FOREIGN PATENT DOCUMENTS

| | | |
|---|---|---|
| 1458646 | 12/1976 | United Kingdom. |
| 1484042 | 8/1977 | United Kingdom. |
| 1546053 | 5/1979 | United Kingdom. |

Primary Examiner—Donald J. Yusko
Assistant Examiner—Dervis Magistre

[57] ABSTRACT

A method and apparatus for electronic financial transaction processing systems used by customers of certain credit or electronic banking card-issuing institutions. The present invention involves two levels of secure interaction between the customer and the card-issuing institution. The first level of interaction involves the enrollment of a customer in the institution's electronic financial transaction processing system. The customer either selects or is issued a personal identification number and a card encoded with a personal key. The personal key and peronal identification number are used to generate a PIN transmission number and personal vertification number, which is stored in bank records. The second level of interaction involves the authorization of a customer's use of the electronic financial transaction processing system for executing an electronic transaction. The customer enters his personal identification number and the system reads his encoded card, both of which are used generate a candidate PIN transmission number. The system, at the remote processing center, generates a candidate personal verification number using the transmitted candidate PIN transmission number and compares the candidate PIN transmission number for parity with a PIN transmission number stored in the institution's records.

6 Claims, 6 Drawing Sheets

MULTILEVEL SECURITY APPARATUS AND METHOD WITH PERSONAL KEY

BACKGROUND OF THE INVENTION

This invention relates to the field of electronic financial transaction processing and, more specifically, to a method and means for securing electronic financial transaction processing systems utilizing conventional computer networks for transmission of data from a remote terminal to a host computer system.

The advent of electronic financial transaction processing has precipitated an unprecedented revolution in the manner in which commercial transactions are conducted. Transactions which previously required the physical transfer of currency or commercial paper, such as bank checks, are now executed electronically using computers.

Over the past several years, electronic financial transaction processing has become commonplace. Ordinary consumers may now purchase groceries, gasoline, and airline tickets using an automated teller card or credit card issued to them by their respective banks. In using electronic financial transaction processing to purchase such goods and services, consumers electronically transfer funds from their own bank or credit account to the account of the respective vendor. Hence, electronic financial transaction processing eliminates the consumer's need to carry currency or checks.

Electronic financial transaction processing, as implemented in the context of common consumer use, is generally implemented in one of two ways.

The first most common implementation of electronic financial transaction processing is the automated teller machine, commonly referred to as an ATM. Over the past several years, the use of ATMs has become so widespread that it is virtually an indispensable convenience which banking customers have come to expect as a standard banking service. Generally accessible twenty-four hours a day, ATMs are commonly located at the bank site or in consumer-populated areas such as shopping centers or airports. The banking customer can use the ATM to perform most routine banking transactions such as deposits and withdrawals, account balance updates, credit card payments and so forth.

The second most common implementation of electronic financial transaction processing is the point-of-sale terminal, commonly referred to as a POS terminal. Currently, point-of-sale terminals are most commonly found at gasoline stations and grocery stores. Rather than paying for purchases by check or with cash, consumers use their electronic banking card or credit card to "pay" for their purchase by electronically transferring funds from their own account to the vendor's account. Accordingly, consumers may shop and travel without the requirement that they carry a large amount of cash in order to make purchases.

Electronic financial transaction processing, however, has created a wide variety of security problems unique to the art. While electronic financial transaction processing is highly desirable due to the the elimination of the requirement of carrying cash to make purchases and is an efficient way to accomplish transactions without substantial human intervention, security concerns are of paramount importance as the potential for abuse is considerable. Unauthorized persons, commonly referred to in the trade as "adversaries," could gain access to the electronic financial transaction processing system and conduct a wide variety of damaging fraudulent transactions. Hence, as the vault is critical to the protection of currency and commercial paper, an effective means of securing the electronic financial transaction processing system is likewise essential to the electronic financial transaction processing art.

In most existing electronic financial transaction processing systems, the bank or other cardissuing institution issues the customer a card which has been magnetically encoded with the user's account number. The bank likewise issues or permits the customer to select a personal identification number (PIN), known only to the customer, to be used in authorizing the customer's access to the electronic financial transaction processing system at the time of a given transaction. Normally, the PIN is memorized by the customer. The PIN and card enable customer access to the system and, when properly used by the individual, provide the desired access to the system.

When a customer desires to perform an electronic transaction in such a prior art system, he will enter his PIN at the ATM or POS terminal by the customer prior to proceeding with the transaction. This ATM or POS terminal also will read the card of the individual keying in the PIN. An identity verification is then typically accomplished by a comparison of the PIN or other number derived from the PIN and the customer's account number with the records of the issuing institution. Accordingly, the PIN, which is the basis for the verification process, must usually be transmitted from the ATM or POS terminal to a remote processing station for processing.

Although the above-described card and PIN system provides some protection, this system alone is not sufficiently secure to confidently maintain the integrity of the electronic financial transaction processing system.

The system is vulnerable, if, for example, the PIN itself is transmitted in an unencrypted state to a remote processing station. An adversary monitoring the transmission lines or other channel of communication could intercept the PIN and, using this information, be able to gain unauthorized access to the customer's accounts. Hence, it is not desirable to transmit the PIN from the ATM or POS terminal to the remote processing station.

Consequently, in many existing systems the PIN is transmitted from the ATM or POS terminal in encrypted form. In such a system, the PIN is encrypted using a number, known as a "key," to produce an encrypted PIN. Theoretically, the PIN, when it is transmitted to the remote processing station, is secure because it has been encrypted using a key known only to the card-issuing institution. However, if an adversary ascertains the key, the system is no longer secure as the PIN may be determined if the encryption process can be reversed.

Unlawful acquisition of the key is a particular problem in the POS terminal environment. In the POS terminal environment, the key is typically resident within the terminal itself so as to enable on-site encryption prior to transmission. Because the POS terminal units are generally portable, there is a substantial risk that the terminal might be stolen, disassembled and the key ascertained. In such a scenario, the system once again becomes vulnerable because an adversary could use the key to decrypt other transmitted encrypted PINs.

The transmission of identification and transaction authorization data is usually accomplished utilizing a computer network. The ATM or POS terminal is generally a terminal in a larger data processing network wherein the transmitted PIN may be decrypted and re-encrypted several times before reaching the remote process station.

In this network system, the remote processing station is electronically isolated from the POS terminal. Because the PIN is re-encrypted at various points along the network, the remote processing station, which may be located at the card issuing institution, may have no knowledge as to the PIN encryption key resident within the ATM or POS terminal. The encrypted PIN, as it is received at various points along the network, is re-encrypted using a PIN encryption key unique to that point of transmission.

The existing system, most particularly as applied in the POS terminal environment, remains substantially vulnerable to unauthorized access by adversaries. Because the PIN, albeit encrypted under a number of different PIN encryption keys, itself is transmitted along the network, the PIN remains in constant danger of being captured by an adversary. As the encrypted PIN is decrypted and re-encrypted under several PIN encryption keys as it is transmitted through the network, the adversary consequently has several opportunities to capture the PIN at various points throughout the network. Moreover, the adversary need only ascertain one of these PIN encryption keys in order to capture the transmitted PIN.

Because the security of the PIN encryption keys becomes as important as the security of the PIN itself, key management is a paramount concern. Management of these PIN encryption keys in a complex network can be a very formidable and, in some instances, troublesome task. Accordingly, card-issuing institutions prefer isolating themselves from the network system from a key management perspective.

Consequently, there is a great need in the art of electronic financial transaction processing for a user authorization system, particularly in the POS terminal environment, which minimizes the risk that the PIN will be captured as data is transmitted along a network.

SUMMARY OF THE INVENTION

In accordance with the present invention, a method and means are provided for securing electronic financial transaction processing systems used by customers of certain credit or electronic banking cardissuing institutions. Customers of the card issuing institutions use the electronic financial transaction processing system to execute a variety of transactions, including the electronic transfer of funds between various accounts maintained by the card-issuing institution.

The present invention involves two levels of secure interaction between the customer and the cardissuing institution. The first level of interaction involves the enrollment of a customer in the institution's electronic financial transaction processing system. The second level of interaction involves the authorization of a customer's use of the electronic financial transaction processing system for executing an electronic financial transaction.

Specifically, the present invention includes a novel method for the secure utilization of a customer's electronic financial transaction processing account. The method first includes an enrollment step including the following steps. First a personal key code to be assigned to the customer is generated and a card assigned to the customer encoded with a detectable code representative of the personal key code. An identifying code, such as a bank account number, is also assigned to the customer by the card-issuing institution and encoded on the customer's card. A personal identification number selected by the customer and the assigned identifying code are combined with the personal key code in accordance with an irreversible logical encoding algorithm to produce a personal identification transmission number. The personal identification transmission number and the identifying code assigned to the customer by the card-issuing institution are combined with an institutional key code associated with the card-issuing institution in accordance with another irreversible logical encoding algorithm to produce a personal identification verification number. The personal identification verification number is then stored for future access in records maintained by the card-issuing institution.

The present invention likewise pertains to a method for verifying the authority of a customer to complete a transaction using a card which has been issued to the customer by a card-issuing institution pursuant to the above-described enrollment method. In verifying the customer's authority to accomplish an electronic transaction, the method first includes the steps of sensing the personal key code and the identifying code recorded on the card. The customer seeking authorization likewise enters his personal identification number. A candidate personal identification transmission number is generated at the time of the transaction by combining the candidate personal identification number and the identifying code with the personal key code in accordance with an irreversible logical encoding algorithm. The candidate personal identification transmission number is transmitted to a remote transaction processing system at the card-issuing institution over a conventional computer network. The remote electronic financial transaction processing system combines the candidate personal identification transmission number and the identifying code assigned to the individual, in accordance with another logical encoding algorithm, with an institutional key code associated with the cardissuing institution to generate a candidate personal identification verification number.

The system compares the candidate personal identification verification number generated at the time of transaction with the personal identification verification number, stored by the card-issuing institution, which corresponds to the customer. If the candidate personal verification number and the stored number match, the transaction will be authorized to proceed.

Consistent with the above-described method, the present invention also contemplates an apparatus for encoding each of a plurality of cards, assigned to the customers of card-issuing institutions, for use in secure transactions. The apparatus includes means for generating a personal key code that is to be assigned to the individual customer and a means for supplying an identifying code, such as a bank account number, which has been assigned to the customer by the card-issuing institution. A keyboard or similar means for receiving data from the individual is also provided in order that the individual may enter his personal identification number. A transducer or similar means is provided for recording a detectable code representative of said personal key code upon the card.

The apparatus likewise includes means for producing a personal identification transmission number using a logical algorithmic combination of the personal identification number received from the individual and the personal key code. The personal identification transmission number is supplied to a means for producing a personal identification verification number, which means includes a logical algorithm for combining an institutional key code associated with the card-issuing institution, the personal identification transmission number and the identifying code.

Additionally, the apparatus includes storage means for storing the personal identification verification number in records maintained by the card-issuing institution.

Similarly, the invention likewise includes an apparatus for verifying the authority of a customer to complete a transaction in association with a card presented at the time of transaction. A detectable code representative of a personal key code and an identifying code assigned to the individual is recorded upon the card in the manner previously described. The apparatus includes a keyboard or similar means for receiving a personal identification number from the customer known only to that customer and a transducer or similar means for sensing the encoded personal key code and the identifying code recorded on the card.

Also included in the system is a means for generating a candidate personal identification transmission number using a logical algorithmic combination of the personal key code sensed from the card, the personal identification number received from the individual and the identifying code. The candidate personal identification transmission number is transmitted along a computer network or similar means for transmitting data to the card-issuing institution.

Means are provided for generating a candidate personal identification verification number as a logical algorithmic combination of an institutional key code associated with the card-issuing institution, the candidate personal identification transmission number received from the network and the identifying code. A comparator or similar comparison means for comparing the candidate personal identification verification number with the previously stored personal identification verification number associated with the customer is used to test for parity.

The present invention provides a heretofore unknown method and apparatus for securing electronic financial transaction processing systems by eliminating the requirement that the personal identification number, encrypted or otherwise, be transmitted from the site of use to the remote card-issuing institution for authorization processing. In the present invention, the personal identification number is used only to irreversibly derive a PIN transmission number. It is the PIN transmission number, not the personal identification number, which is transmitted to the remote card-issuing institution for authorization processing.

Because the personal identification number is used in an irreversible encryption process to derive the PIN transmission number, an adversary capturing the PIN transmission number would be unable to ascertain the personal identification number. Hence, after the PIN transmission number is derived by irreversible encryption, the personal identification number, which is immediately erased from the volatile memory of the POS terminal, cannot be captured because it neither leaves the POS terminal unit nor is it retained in the terminal unit after the customer's transaction has been completed.

Moreover, because each customer is assigned a personal key recorded only on his card, unauthorized acquisition of the POS terminal would not aid an adversary in his efforts to compromise the security of the system. The introduction of a second variable, i.e., the personal key, into the security scheme renders the system more secure as the adversary's task becomes more formidable. He must acquire *both* the customer's personal key and his or her personal identification number to obtain access to the electronic financial transaction processing system.

Further, because the personal identification number is not transmitted, the previous security concerns regarding the repeated decryption and reencryption under different PIN encryption keys at various points along the network are relaxed. Although the acquisition of a customer's PIN transmission number by an adversary would be undesirable, such acquisition would not render the security of the system compromised as the adversary requires both the user's personal key and his personal identification number to invade the system. Neither of these numbers could be ascertained from the transmitted PIN transmission number.

Consequently, it is an object of the present invention to enable the secure transmission of electronic financial transaction processing data authorization data along a conventional computer network system.

It is a further object of the present invention to eliminate the requirement that the customer's personal identification number, in encrypted form or otherwise, be transmitted along a conventional computer network.

It is yet a further object of the present invention to inject a further dimension of security into an electronic financial transaction processing system by maintaining two security parameters for each customer, i.e. both a personal identification number and a personal key.

DETAILED DESCRIPTION OF THE DRAWINGS

Figure 1:
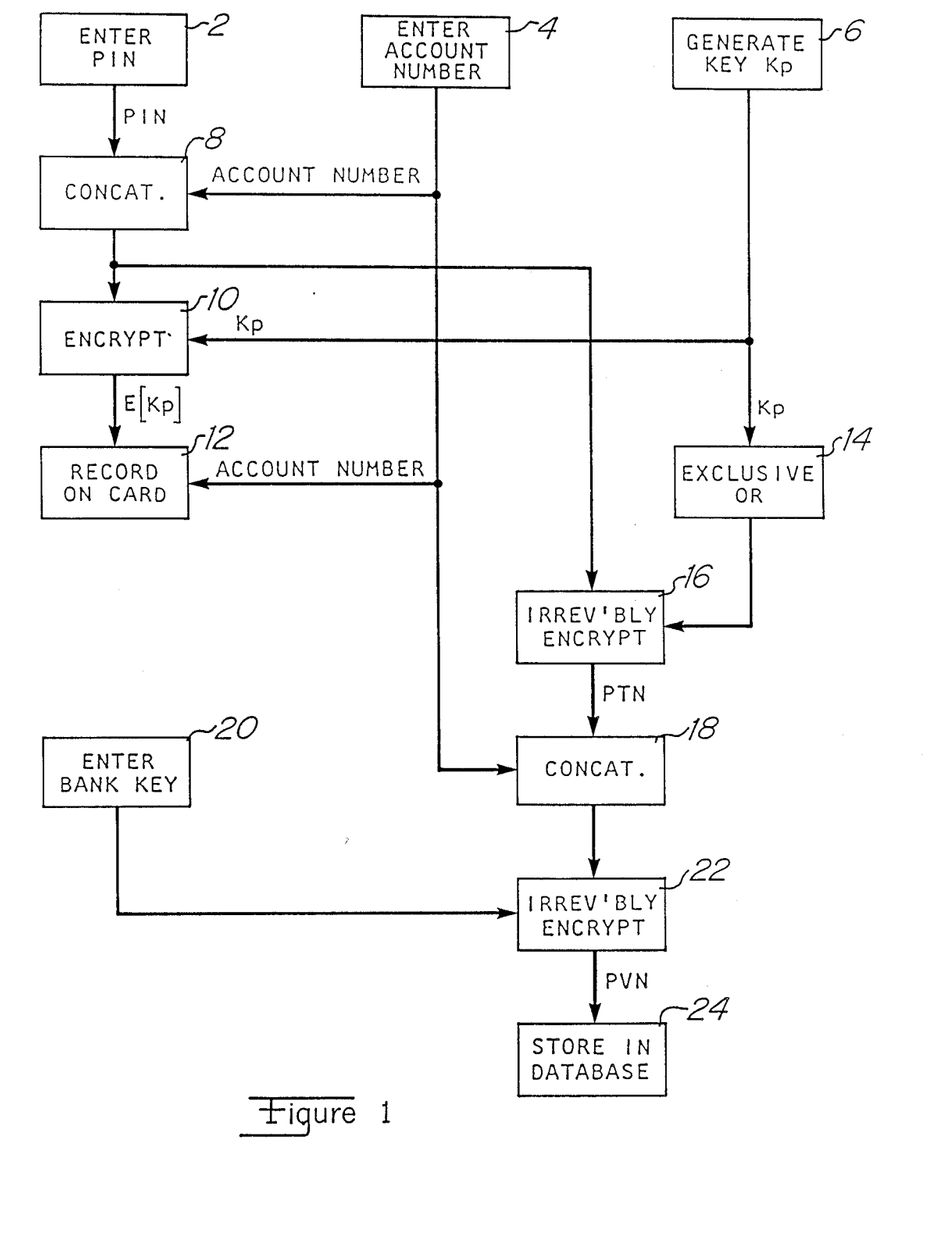
FIG. 1 is a flowchart diagram illustrating an embodiment of the customer enrollment process of the present invention.

FIG. 1 is a flowchart diagram of the system of the present invention which operates on the personal identification number of an individual, identification information furnished by an operator of the system, and a randomly generated personal key to enroll a customer in a card-issuing institution's electronic financial transaction processing system.

A customer, prior to enjoying the benefits of electronic financial transaction processing, must first enroll with a card-issuing institution. In the initial sign-on transaction, an individual may select any code word or set of numbers, or combination thereof, as his personal identification number, which he may preserve in total secrecy. Referring to FIG. 1, the customer initially enters this secret personal identification number (hereinafter "PIN") at 2 into the system using any conventional data input means, such as a keyboard, telephone dial apparatus, or the like, not shown in FIG. 1.

An operator of the system also enters an assigned account number at 4. Additionally, the system includes a random number generator, not shown in FIG. 1, to randomly generate a personal key, $K_p$, at 6, which is unique to the individual enrolling in the electronic financial transaction processing program. Thus, as shown at 8, the customer's PIN and all or part of the account number are concatenated in a conventional manner to produce a concatenated PIN/account number data string.

The concatenated PIN/account number data string and personal key are supplied to an encoding device for the reversible encryption of the data, shown at 10, to generate an encrypted personal key (hereinafter referred to as "$E[K_p]$"). The encryption step at 10 may be performed using a conventional National Bureau of Standards (hereinafter "NBS") data encryption integrated circuit, not shown in FIG. 1, which is commercially available from Motorola, Inc.

The encrypted personal key $E[K_p]$ and the account number are then recorded, at 12, on a card, not shown in FIG. 1, mechanically, optically, magnetically or the like, in a conventional manner, for use by the individual in a subsequent transaction.

The concatenated PIN/account number data string is logically combined, at 14, using a conventional exclusive OR function with the randomly generated personal key, $K_p$. The concatenated PIN/account number data string and the logical combination of the concatenated PIN/account number data string and personal key, $K_p$, shown at 14 are supplied to an encoding device, not shown in FIG. 1, for irreversible encryption of the supplied data, shown at 16, to generate a first compiled code word or PIN transmission number (PTN). This irreversible encryption, at 16, may utilize an encoding device, not shown in FIG. 1, which may include a conventional NBS data encryption integrated circuit, as noted above, and may be operated according to a known irreversible algorithm. An example of such an irreversible algorithm is disclosed in U.S. Pat. No. 3,938,091 and U.S. Pat. No. 4,198,619.

The personal transmission number itself is then concatenated with the account number, at 18, in a conventional manner to produce a concatenated PTN/account number data string. A secret identification key, known only by the card-issuing institution at 20, and the concatenated PTN/account number data string, at 18, are supplied to an encoding device, not shown in FIG. 1, for irreversible encryption, at 22, of the supplied data to generate a second compiled code word, or PIN verification number (PVN). This irreversible encryption at 22 may be accomplished by an encoding device, not shown in FIG. 1, which may include a conventional NBS data encryption integrated circuit, as discussed above, and may also be operated according to a known irreversible algorithm such as that disclosed in U.S. Pat. No. 3,938,091 or U.S. Pat. No. 4,198,619.

The personal verification number is stored, at 24, in the card-issuing institution data base for access during subsequent transactions. The personal verification number may, at the institution's option, be encrypted under a file storage key, not shown in FIG. 1, and stored in the database by account number.

Figure 2:
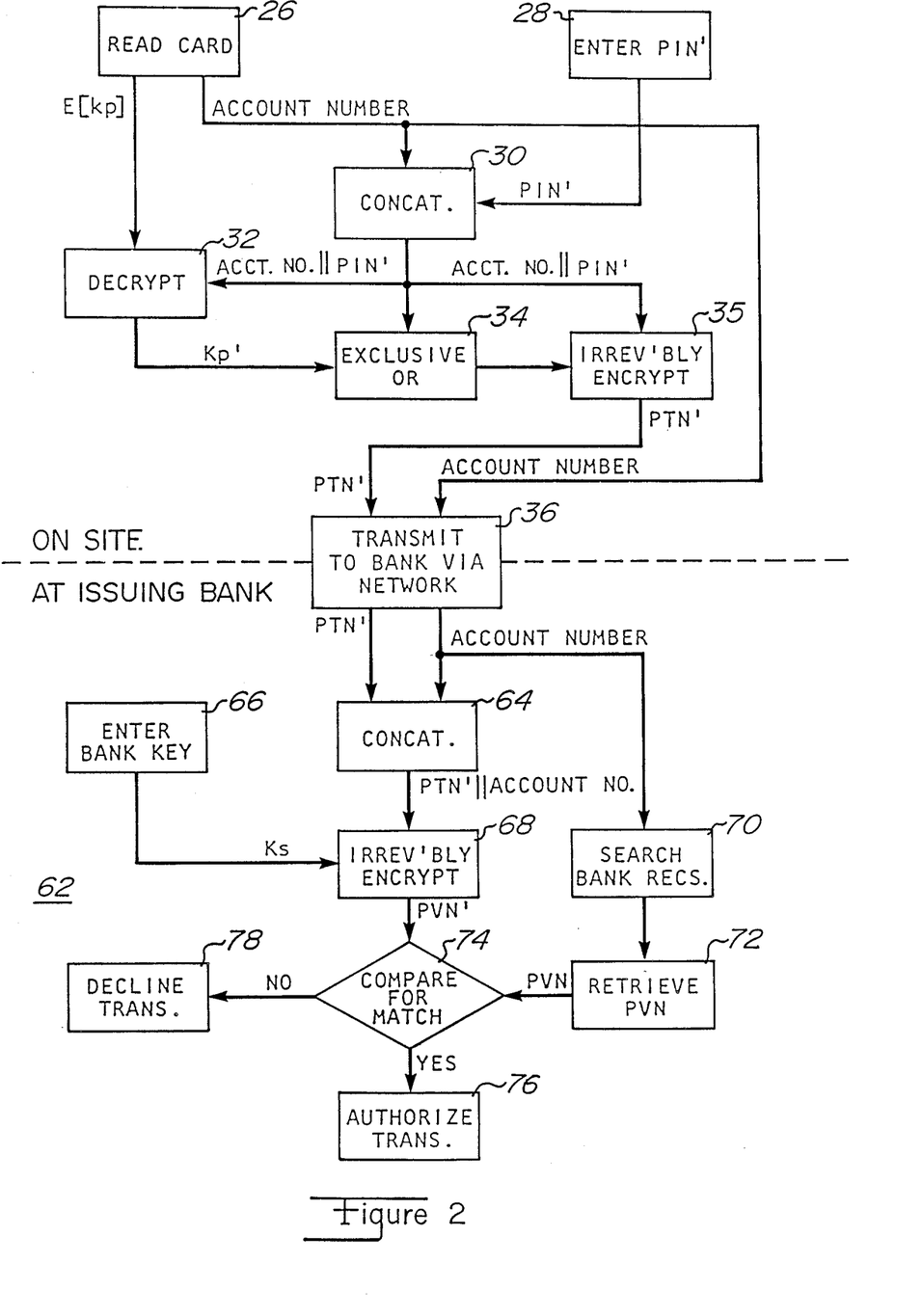
FIG. 2 is a flowchart diagram illustrating an embodiment of the transaction authorization process of the present invention.

FIG. 2 is a flow chart diagram of an embodiment of the present invention illustrating the process of executing a subsequent transaction utilizing the card upon which a personal key has been encrypted in the above described manner. A customer desiring to utilize electronic financial transaction processing, for example, to purchase goods using a POS terminal, not shown in FIG. 2, would have with him or her a card encoded in the manner previously described. The POS terminal, not shown in FIG. 2, reads the card mechanically, optically, magnetically or the like at 26, as appropriate, depending on the type of card used, in a conventional manner.

As described previously, the card, not shown in FIG. 2, has been encoded with the customer's account number and an encrypted personal key $E[K_p]$. The customer enters his personal identification number, at 28, referred to hereinafter as the candidate PIN (PIN') on a keyboard or similar data entry device, not shown in FIG. 2. The keyed-in PIN and the account number that has been read from the card at 26 are concatenated in a conventional manner, at 30, to produce a concatenated account number/PIN, data string. The encoded personal key, $E[K_p]$, read from the card at 26 and the concatenated account number/PIN, data string are supplied to a decoding device, not shown in FIG. 2, for decryption, at 32, to generate a candidate personal key $K'_p$.

The candidate personal key, $K'_p$, is logically combined, at 34, using a conventional exclusive OR function with the concatenated account number/PIN' data string. The logical combination of the candidate personal key, $K_p'$, and the concatenated account number/PIN, data string are supplied to an encoding device, not shown in FIG. 2, for irreversible encryption, at 35, of the supplied data to generate a first compiled code word, or candidate personal transmission number (PTN,) This encoding means may include the aforementioned NBS circuit and may encrypt the applied data according to an algorithm of the type described in the aforementioned U.S. Pat. No. 3,938,091, U.S. Pat. No. 4,198,619, or the like.

The candidate PIN transmission number and the account number read from the card are then transmitted, at 36, to the bank or other card issue using a conventional computer network.

Figure 3:
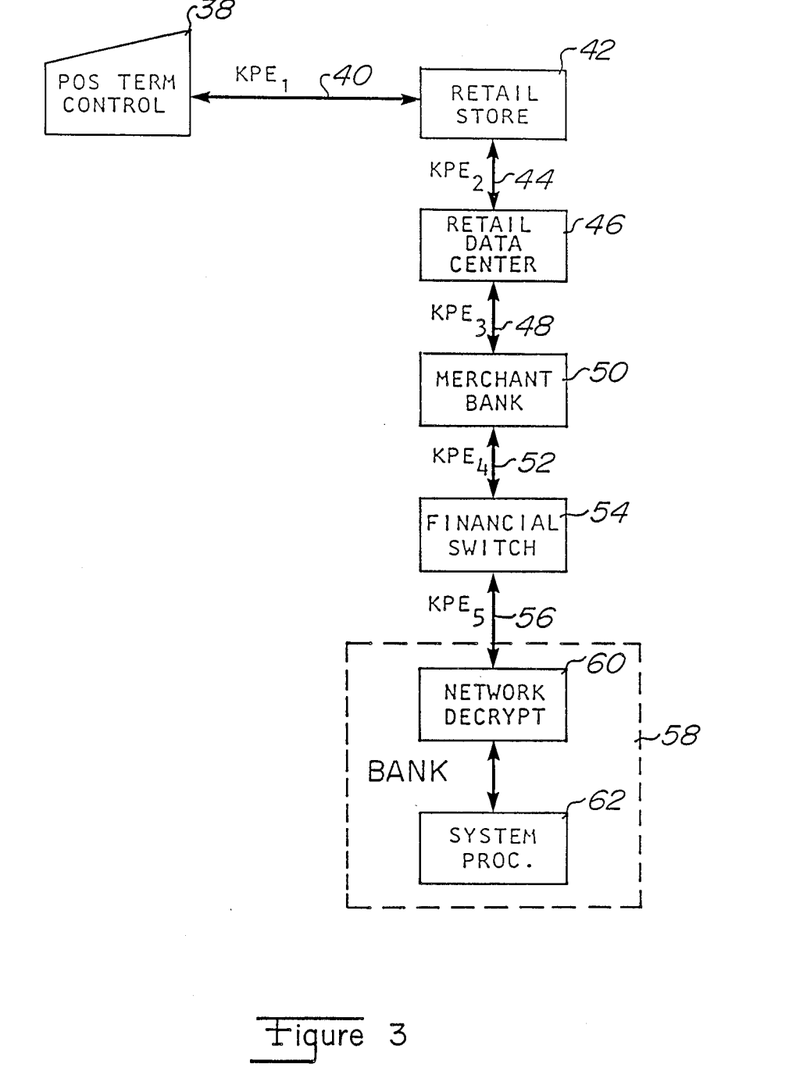
FIG. 3 is a block diagram illustrating a typical computer network which might be used to transmit data in the present invention.

A typical computer network used to transmit the type of data described immediately above is shown in block diagram form in FIG. 3. The system shown in FIG. 3 is merely an example of the type of computer network which may be used to transmit the aforementioned data from the POS terminal to a remote processing station maintained by the card-issuing entity. Any number of computer networks could be used to accomplish the transmission of this data.

The candidate personal transmission number and the customer's account number, not shown in FIG. 3, are encrypted at the POS terminal controller 38 under a PIN encryption key, $KPE_1$, and transmitted along line 40 to a retail store computer 42. The retail store computer 42 decrypts the data received from the POS terminal controller 38 and re-encrypts that data under the retail store computer PIN encryption key, $KPE_2$. The retail store computer 24 transmits the data encrypted under $KPE_2$ along network transmission line 44 to a retail data center 46. The retail data center computer 46 decrypts the data received from the retail store computer 42 and re-encrypts that data under a retail data center PIN encryption key, KPE$_3$. The retail data center computer 46 transmits the data encrypted under KPE$_3$. The retail data center computer 46 transmits the data encrypted under KPE$_3$ along network transmission line 48 to a merchant bank computer 50. Merchant bank computer 50 decrypts the data received from the retail data center computer 46 and re-encrypts the data under a merchant bank PIN encryption key, KPE$_4$. The merchant bank computer 50 transmits the data encrypted under KPE$_4$ to a financial switch 54 along network transmission line 52. The financial switch 54, which might be a financial switch such as INTERLINK, decrypts the data received from merchant bank computer 50 and re-encrypts that data under a financial switch PIN encryption key, KPE$_5$. The financial switch 54 transmits the data encrypted under KPE$_5$ to the card-issuing bank 58 along network transmission line 56. The data encoded by the financial switch 54 under KPE$_5$ is decrypted 60 at the card-issuing bank. The decrypted candidate PIN transmission number and account number, not shown in FIG. 3, are supplied to the electronic financial transaction processing system 62 for processing.

Referring again to FIG. 2, shown are the steps taken by the bank or other card issuer to verify the identity of the customer using his or her card in a financial transaction according to the present invention. First the candidate PIN transmission number and customer account number are first concatenated, at 64, in a conventional manner to produce a concatenated PTN'/account number data string. A secret bank key, K$_S$, entered at 66 by the card-issuing institution, and the concatenated PTN'/account number data string are supplied to an encoding device, not shown in FIG. 2, for irreversible encryption, at 68, of the data to generate a second compiled code word or candidate PIN verification number (PVN,). The encoding device, not shown in FIG. 2, may include the aforementioned NBS circuit and be operated according to a known irreversible algorithm such as the aforementioned algorithm disclosed in U.S. Pat. No. 3,938,091, and U.S. Pat. No. 4,198,619, or the like.

The system uses the account number read from the customer's card to search bank records, at 70, for the PIN verification number (PVN) associated with the customer's account number. As previously discussed in connection with the enrollment process, the PVN, as shown in FIG. 1, was stored in the card-issuing institution's database at the time of enrollment for subsequent retrieval. Based upon the account number read from the card, the system will retrieve the PIN verification number, at 72, corresponding to the account number read from the card As noted earlier, the stored PIN verification number may be stored in an encrypted form. If such is the case, the encrypted PIN verification number will be decrypted under the appropriate file key, not shown in FIG. 2, at the time of retrieval.

The candidate PIN verification number and the PIN verification number retrieved from the database records are compared, at 74, in a conventional manner. If the candidate PIN verification number is identical to the PIN verification number retrieved from the bank database, the transaction will be authorized, shown at 76, and the customer is then free to access the electronic financial transaction processing system. If, however, the candidate PVN and the PVN retrieved from the bank database do not match, the customer's access to the electronic financial transaction processing system will be denied, as shown at 78.

Figure 4:
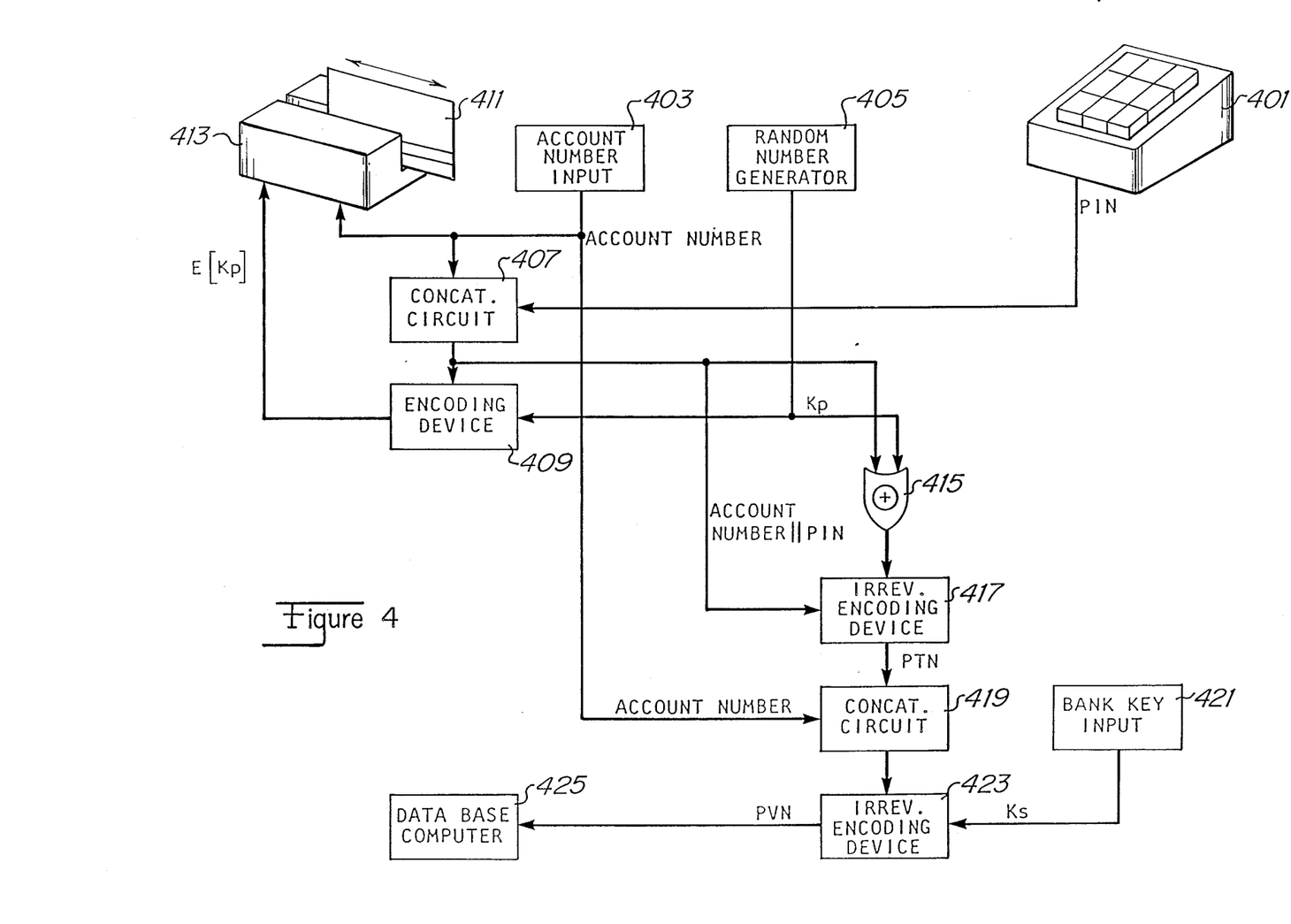
FIG. 4 is a block diagram of the illustrated embodiment of the system of the present invention.

FIG. 4 is a block diagram of the system of the present invention which enables a customer in a card-issuing institution's electronic financial transaction processing system. It operates on the personal identification number of the customer, the identification information furnished by an operator of the system, and a randomly generated personal key.

As noted above, a customer, prior to enjoying the benefits of electronic financial transaction processing, must first enroll with a card-issuing institution. In the initial sign-on transaction, the customer may select any code word or set of numbers, or combination thereof, as his personal identification number, which he may preserve in total secrecy. Referring to FIG. 4, the customer initially enters this secret personal identification number (hereinafter "PIN") into the system using any conventional data input means, such as keyboard 401. It is to be understood, however, that any conventional data input means such as a telephone dial apparatus, or the like, not shown in FIG. 1, may be used to input the PIN.

An operator of the system also enters an assigned account number at account number input 403. Additionally, the system includes a random number generator 405 to randomly generate a personal key, K$_p$ that is unique to the individual enrolling in the electronic financial transaction processing program. Thus, the customer's PIN and all or part of the account number are concatenated in a conventional manner by concatenation circuit 407 to produce a concatenated PIN/account number data string.

The concatenated PIN/account number data string and personal key are supplied to an encoding device 409 for the reversible encryption of the data to generate an encrypted personal key (hereinafter referred to as "E[K$_p$]"). Encoding device 409 may include a conventional National Bureau of Standards (hereinafter "NBS") data encryption integrated circuit, not shown in FIG. 1, which is commercially available from Motorola, Inc.

The encrypted personal key E[K$_p$] and the account number are then recorded on card 411 using transducer 413. Although FIG. 4 shows transducer 413 to be a magnetic transducer system, it is to be understood that the recording may be accomplished mechanically, optically, magnetically or the like, in a conventional manner. Card 411 is then given to the customer for use by the individual in a subsequent transactions.

The concatenated PIN/account number data string, which was concatenated by concatenation circuit 407, is logically combined, using a conventional exclusive OR circuit 415, with the randomly generated personal key. K$_p$. The concatenated PIN/account number data string and the logical combination of the concatenated PIN/account number data string and personal key, K$_p$, are supplied to an encoding device 417 for irreversible encryption of the data to generate a first compiled code word, or PIN transmission number (PTN). Encoding device 417 may include a conventional NBS data encryption integrated circuit, as noted above, and may be operated according to a known irreversible algorithm. An example of such an algorithm is disclosed in U.S. Pat. No. 3,938,091 and U.S. Pat. No. 4,198,619.

The personal transmission number itself is then concatenated in the conventional manner with the account number by concatenation circuit 419 to produce a concatenated PTN/account number data string. A secret identification key, known only by the card-issuing institution, is input at bank key input 421. The secret identification key, input at bank key input 421, and the concatenated PTN/account number data string are supplied to an encoding device 423 for irreversible encryption of the supplied data to generate a second compiled code word or PIN verification number (PVN). Encoding device 423 may include a conventional NBS data encryption integrated circuit, as discussed above, and may also be operated according to a known irreversible algorithm such as that disclosed in U.S. Pat. No. 3,938,091 or U.S. Pat. No. 4,198,619.

The personal verification number is stored in the card-issuing institution data base computer 425 for access during subsequent transactions. The personal verification number may, at the institution's option, be encrypted under a file storage key, not shown in FIG. 4, and stored in the database by account number.

Figure 5A:
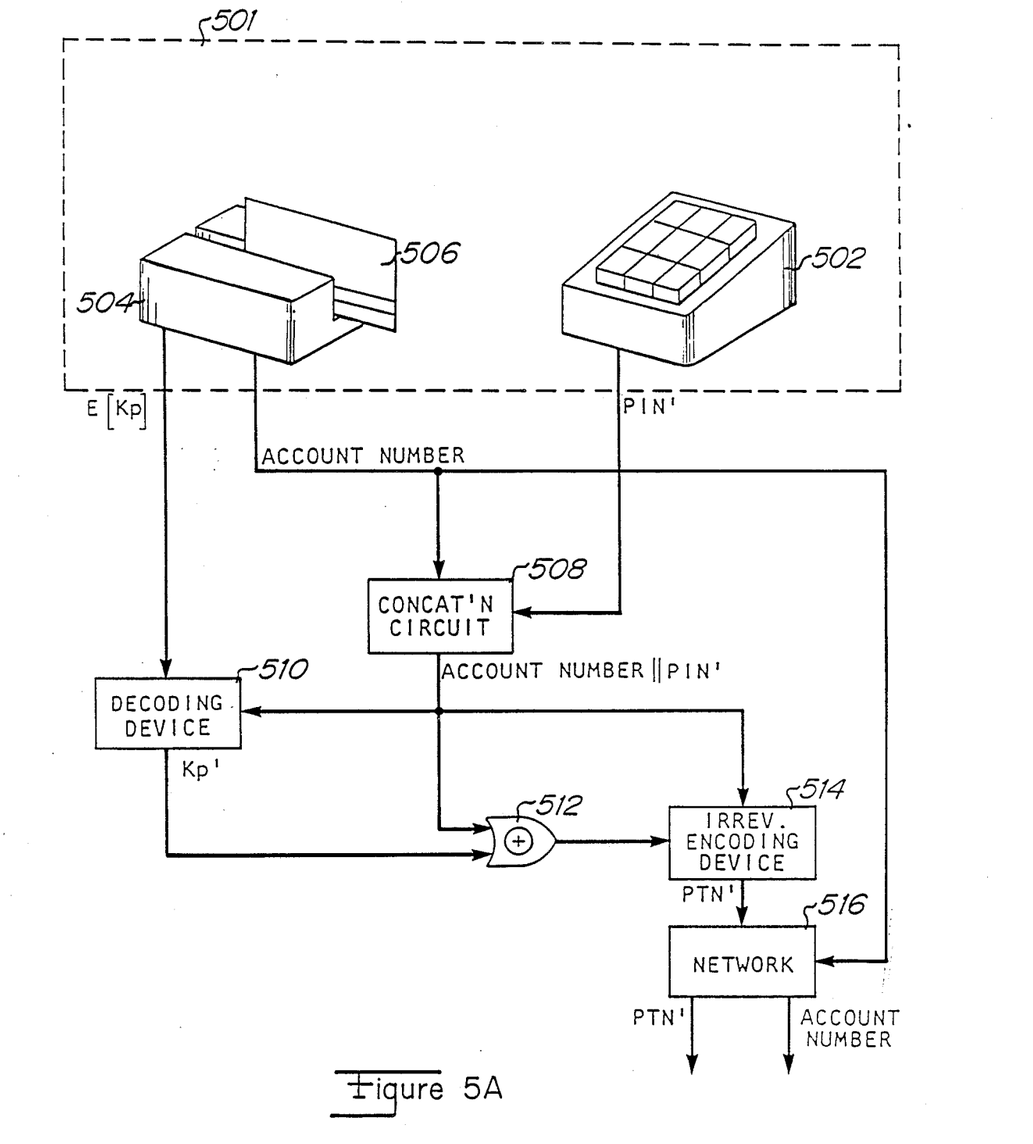
FIGS. 5A and 5B are block diagrams of the illustrated embodiment of the system installed, respectively, at the transaction site and at the remote transaction processing station.
Figure 5B:
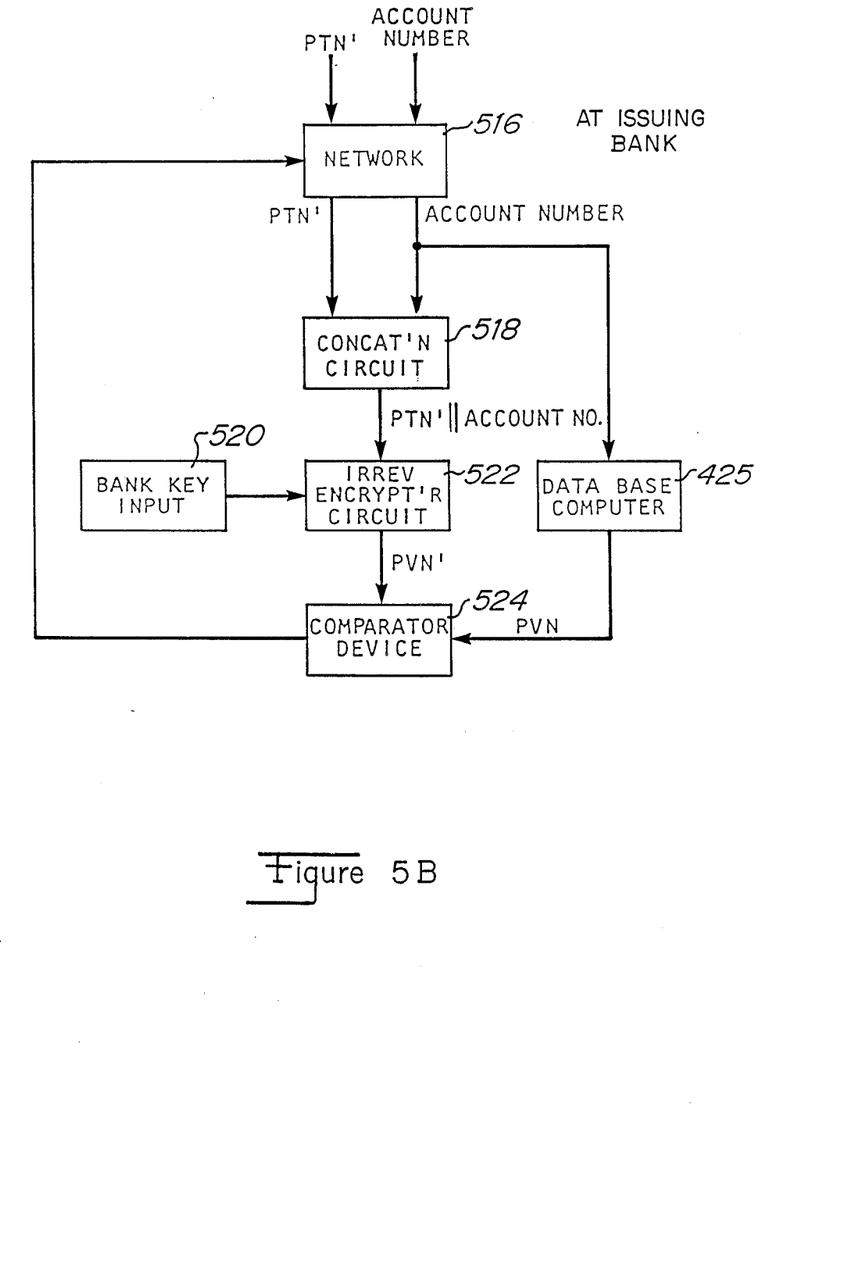

FIGS. 5a and 5b are block diagrams of an embodiment of the present invention which illustrates the apparatus used to execute a subsequent transaction utilizing the card upon which a personal key has been encrypted.

Referring to FIG. 5a, the portion of the preferred embodiment of the present invention installed at the transaction site is shown. A customer desiring to utilize electronic financial transaction processing to purchase goods, for example, using a POS terminal is usually requested at the time of transaction to produce his card, which presumably has been encoded in the manner previously described. The POS terminal 501, which includes keypad 502 and card reader 504, reads the card 506. It is to be understood that the card reader 504, although shown in FIG. 5a to be a magnetic card transducer, may be a mechanical, optical, magnetic or the like type of card reader, as appropriate depending on the type of card used.

As described previously, the card 506 has been encoded with customer's account number and an encrypted personal key $E[K_p]$. The customer enters a candidate personal identification number (PIN,) on keypad 502. The keyed in PIN, and the account number read from the card are concatenated in the conventional manner by concatenation circuit 508 to produce a concatenated account number/PIN, data string. The encoded personal key, $E[K_p]$, read from the card 506 and the concatenated account number/PIN, data string are supplied to a decoding device 510 for decryption. Decoding device 510 generates a candidate personal key $K_{p'}$.

The candidate personal key, $K'_{p'}$, is logically combined, using a conventional exclusive OR circuit 512, with the concatenated account number/PIN, data string. The logical combination of the candidate personal key, $K_{p''}$, and the concatenated account number/PIN, data string are supplied to an encoding device 514 for irreversible encryption of the data to generate a first compiled code word or candidate personal transmission number (PTN,). The encoding device 514 may include the aforementioned NBS circuit and may encrypt the applied data according to an algorithm of the type described in the aforementioned U.S. Pat. No. 3,938,091 or U.S. Pat. No. 4,198,619 or the like.

The PTN° and the account number read from the card are then transmitted to the bank using a conventional computer network 516.

FIG. 5b illustrates the portion of the preferred embodiment residing at the remote transaction processing station. Referring to FIG. 5b, the candidate PIN transmission number and customer account number received from network 516 are concatenated in the conventional manner by concatenation circuit 518 to produce a concatenated PTN,/account number data string. A secret bank key, $K^S$, entered by the card-issuing institution at bank key input 520, and the concatenated PTN,/account number data string are supplied to encoding device 522 for irreversible encryption of the supplied data to generate a second compiled code word or candidate PIN verification number (PVN,). The encoding device 522 may include the aforementioned NBS circuit and may be operated according to a known irreversible algorithm such as the aforementioned algorithm disclosed in U.S. Pat. No. 3,938,091, and U.S. Pat. No. 4,198,619, or the like.

The system uses the account number read from the customer's card to search bank records for the PIN verification number associated with the customer's account number. As previously discussed in connection with he enrollment process, the customer's PVN was stored in the card-issuing institution's database computer 425 at the time of enrollment for subsequent retrieval. Based upon the account number read from the card, the system will retrieve the PIN verification number, in the conventional manner, from database computer 425 corresponding to the account number read from the card.

As noted earlier, the stored PIN verification number may be stored in an encrypted form. If such is the case, the encrypted PIN verification number will be decrypted under the appropriate file key, not shown in FIG. 5b, at the time of retrieval.

The candidate PIN verification number and the PIN verification number retrieved from the database computer 425 are compared in a conventional manner by comparator device 524. If the candidate PIN verification number is identical to the PIN verification number retrieved from the bank database, the transaction will be authorized and an authorization signal transmitted to the POS terminal, not shown in FIG. 5b, by computer network 516. The customer is then free to access the electronic financial transaction processing system. If, however, there is no parity between the candidate PVN and the PVN retrieved from the bank database, the customer's access to the electronic financial transaction processing system will be denied and a "decline transaction" signal will be transmitted to the POS terminal, not shown in FIG. 5b, along computer network 516.

Changes and modifications in the specifically described embodiments can be carried out without departing from the scope of the invention which is intended to be limited only by the scope of the appended claims.

What is claimed is:

1. A method for encoding a card assigned by an entity to an individual for use in completing secured transactions with respect to an account number indicated on the card, the method comprising the steps of:
   generating a personal key code assigned to the individual;
   forming an encoded combination of the account number and a secret code received from the individual;
   forming an encrypted personal key as a logical combination of the personal key code and said encoded combination;
   encoding the card with a detectable code representative of said encrypted personal key;

combining in accordance with an irreversible logical encoding combination said encoded combination and the personal key code to produce a personal identification transmission code;

combining in accordance with a second logical encoding combination the personal identification transmission code and account number and an institutional key code associated with the entity to produce a personal identification verification code; and storing the personal identification verification code for subsequent retrieval.

2. A method for verifying the authority of an individual to complete a transaction with respect to an account number indicated on a card which is assigned by an entity to the individual, the card having recorded thereupon a detectable code representative of an encrypted personal key and the account number assigned to the individual, and the entity having stored for retrieval a personal identification verification code corresponding to the individual, the method comprising the steps of:

sensing the account number and encrypted personal key recorded on the card;

generating a personal identification transmission code associated with the transaction by combining in accordance with an irreversible logical encoding combination a secret code received from the individual and the account number and the account number, the secret code received from the individual, sensed from the card assigned to the individual;

transmitting the personal identification transmission code and account number to the entity;

generating at the entity a personal identification verification code associated with the transaction by combining in accordance with a second logical encoding combination the personal identification transmission code and the account number received at the entity with an institutional key code associated with the entity;

comparing the personal identification verification code generated in associated with the transaction with the stored personal identification verification code corresponding to the individual; and generating a transaction authorization signal in response to the stored personal identification verification code comparing favorably with the personal identification verification code generated in association with the transaction.

3. The method according to claim 2 comprising the step of:

reproducing the personal key code associated with the transaction by decoding the account number and said encrypted personal key sensed from the card and a secret code received from the individual associated with the transaction; and in the step of generating a personal identification transmission code, the secret code received from the individual and the account number and said reproduced personal key are combined in accordance with an irreversible logical encoding combination thereof.

4. Apparatus for encoding each of a plurality of cards assigned to individuals by an entity for use in completing secure transactions with respect to account numbers indicated on the cards, the apparatus comprising:

means for generating a personal key code assigned to an individual;

first logic means for encoding an account number indicated on one card with a secret code received from an individual to form an encoded output;

second logic means coupled to receive said encoded output and the generated personal key code for producing therefrom an encrypted personal key;

transducer means disposed to receive said encrypted personal key for recording a detectable code representative of said encrypted personal key upon said one card;

third logic means for producing a personal identification transmission code as an irreversible logical combination of the encrypted personal key and the personal key code assigned to such individual;

fourth logic means for producing a personal identification verification code as a logical combination of an institutional key code associated with the entity and the personal identification transmission code and the accounts number indicated on said one card assigned to the individual by the entity; and, storage means for storing the personal identification verification code for subsequent retrieval.

5. Apparatus for verifying the authority of an individual to complete a transaction with respect to an account number indicated on a card which is assigned by an entity to the individual, the card having recorded thereon a detectable code representative of an encrypted personal key and the account number assigned to the individual, and the entity having stored for retrieval a personal identification verification code corresponding to the individual, the apparatus comprising:

transducer means for sensing the account number and the encrypted personal key indicated on a card;

first logic means for generating a personal identification transmission code for transmission to the entity as an irreversible logical combination of a secret code received from an individual, and the account number, and the encrypted personal key sensed from the card assigned to the individual;

second logic means at the entity for generating a personal identification verification code as a logical combination of an institutional key code associated with the entity and the account number, and the personal identification transmission code received at the entity;

comparison means for comparing the personal identification verification code generated at the entity with a personal identification verification code associated with the individual and retrieved from storage for producing a signal indicative of favorable comparison thereof.

6. Apparatus according to claim 5 wherein:

first logic means reproduces the personal key code as a logical combination of the encrypted personal key sensed form the card with the secret code received from the individual, and generates a personal identification transmission code as an irreversible logical combination of the reproduced personal key code, and account number, and the secret code received from the individual.

* * * * *